(12) United States Patent
Konishi

(10) Patent No.: US 10,706,319 B2
(45) Date of Patent: Jul. 7, 2020

(54) TEMPLATE CREATION APPARATUS, OBJECT RECOGNITION PROCESSING APPARATUS, TEMPLATE CREATION METHOD, AND PROGRAM

(71) Applicant: OMRON Corporation, Kyoto-shi, Kyoto (JP)

(72) Inventor: Yoshinori Konishi, Souraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 77 days.

(21) Appl. No.: 15/982,528

(22) Filed: May 17, 2018

(65) Prior Publication Data

US 2018/0365516 A1 Dec. 20, 2018

(30) Foreign Application Priority Data

Jun. 15, 2017 (JP) ................. 2017-117615

(51) Int. Cl.
*G06K 9/62* (2006.01)
*G06T 17/00* (2006.01)
*G06K 9/00* (2006.01)

(52) U.S. Cl.
CPC ....... *G06K 9/6202* (2013.01); *G06K 9/00201* (2013.01); *G06T 17/00* (2013.01)

(58) Field of Classification Search
CPC ............ G06K 9/6202; G06K 9/00201; G06K 9/6201; G06T 17/00
USPC ....................................... 382/209
See application file for complete search history.

(56) References Cited

U.S. PATENT DOCUMENTS 8,306,314 B2 11/2012 Tuzel et al.

FOREIGN PATENT DOCUMENTS

EP 2048599 A1 4/2009

OTHER PUBLICATIONS

Aldoma, Aitor, et al. "Tutorial: Point cloud library: Three-dimensional object recognition and 6 dof pose estimation." IEEE Robotics & Automation Magazine 19.3 (2012): 80-91. (Year: 2012).*
Ulrich, M., Wiedemann, C., & Steger, C. (2011). Combining scale-space and similarity-based aspect graphs for fast 3D object recognition. IEEE transactions on pattern analysis and machine intelligence, 34(10), 1902-1914. (Year: 2011).*
Markus Ulrich et al, Combining Scale-Space and Similarity-Based Aspect Graphs for Fast 3D Object Recognition, IEEE Transactions on Pattern Analysis and Machine Intelligence, ISSN: 0162-8828, Oct. 1, 2012, pp. 1902-1914, vol. 34, No. 10, IEEE Computer Society, USA.

(Continued)

*Primary Examiner* — Amandeep Saini
(74) *Attorney, Agent, or Firm* — Metrolex IP Law Group, PLLC

(57) ABSTRACT

A viewpoint position-related parameter setting unit determines which approximate spherical shape to use in order to determine a viewpoint position. A viewpoint position creation unit creates a plurality of approximate spherical shapes set by the viewpoint-position-related parameter setting unit, and creates respective viewpoint positions. An optimal viewpoint position creation unit calculates a rotation angle at which the number of slave viewpoints associated with master viewpoints is substantially equal and a maximum distance between the master viewpoint and the slave viewpoint associated therewith is a minimum.

9 Claims, 11 Drawing Sheets

(56) References Cited

OTHER PUBLICATIONS

Aitor Aldoma et al, Tutorial: Point Cloud Library: Three-Dimensional Object Recognition and 6 DOF Pose Estimation, IEEE Robotics & Automation Magazine, ISSN: 1070-9932, Sep. 1, 2012, pp. 80-91, vol. 19, No. 3, IEEE Service Center, Piscataway, NJ, US.
Munkelt Olaf, Aspect-trees: generation and interpretation, Computer vison and image understanding, XP055513703, URL:https://www.sciencedirect.com/science/article/pii/S1077314285710296 (retrieved on Oct. 9, 2018), May 3, 1995, p. 365-386, vol. 61, No. 3, Academic Press, Inc.
Stefan Hinterstoisser et al, Technical Demonstration on Model Based Training, Detection and Pose Estimation of Texture-Less 3D Objects in Heavily Cluttered Scenes, Medical image computing and computer-assisted intervention—MICCAI 2015 18th international conference, Munich. Germany. Oct. 5-9. 2015, proceedings, XP055514138, ISSN: 0302-9743, ISBN: 978-3-319-24946-9, Jan. 1, 2012, pp. 593-596, vol. 7585, Springer International Publishing.
Munoz E et al, Fast 6D pose estimation for texture-less objects from a single RGB image, 2016 IEEE International Conference on Robotics and Automation (ICRA), XP032908804, May 16, 2016, pp. 5623-5630, IEEE.
The extended European search report dated Oct. 25, 2018 in a counterpart European Patent application.

\* cited by examiner

TEMPLATE CREATION APPARATUS, OBJECT RECOGNITION PROCESSING APPARATUS, TEMPLATE CREATION METHOD, AND PROGRAM

CROSS-REFERENCES TO RELATED APPLICATIONS

This application claims priority to Japanese Patent Application No. 2017-117615 filed Jun. 15, 2017, the entire contents of which are incorporated herein by reference.

FIELD

The disclosure relates to a technique for creating a template used for object recognition by template matching.

BACKGROUND

One method for detecting a target object from an object recognition image is template matching. In template matching, a model (template) of an object serving as a detection target is prepared in advance, and a two-dimensional position and orientation of the object included in an input image is detected by evaluating the degree of matching of image feature between the input image and the model. Object detection using template matching is used in various fields such as inspection and picking in FA (Factory Automation), robot vision, and surveillance cameras. Particularly in recent template matching, attention has shifted from techniques applied to detection of the position and orientation of the target object using two-dimensional measurement to techniques applied to detection of the position and orientation of the target object using three-dimensional measurement.

As template matching using three-dimensional measurement, a search processing method in which an individual template is prepared for each orientation of the target object viewed from various viewpoints and matching is performed with respect to all of the templates in turn has been proposed, but there is a problem in that the processing time for matching using the templates increases because the number of templates that have to be prepared is very large compared with template matching using two-dimensional measurement.

As a countermeasure to such a problem, template matching by a coarse-to-fine search is known. The coarse-to-fine search is one technique for speeding up search processing using template matching, and involves repeatedly performing processing to prepare a group of images (so-called image pyramid) in which resolutions are gradually differentiated, perform a coarse search using a low-resolution image, narrow the search range based on a search result, and perform a further search with a high-resolution image for the narrowed search range, before, finally, detecting the position and orientation of the target object at the original resolution (recognition of the position and orientation of the object; hereinafter simply referred to "object recognition").

Here, FIG. 10 is a diagram showing a basic concept of a coarse-to-fine search using an image pyramid.

As shown in FIG. 10, in the coarse-to-fine search, a group of k images (image pyramid) constituted by a first layer to a k-th layer (k is an integer greater than or equal to two) in which the resolutions are gradually differentiated is used. The resolution of the first layer is the lowest, and resolution becomes increases in the order of the second layer to the k-th layer. FIG. 10 is an example in a case where k is three, the third layer corresponds to the original image, and the resolution becomes decreases in the order from the second layer to the first layer.

In the coarse-to-fine search, firstly, search processing using template matching (comparison) on a first layer image whose resolution is the lowest is performed, and an existence position (correct candidate) of the object in the first layer is detected (refer to detection position shown in the first layer image in FIG. 10). Next, in search processing for the second layer, a second layer image corresponding to the detection position in the first layer is set as a search range, and search processing for that search range is performed (refer to detection position shown in the second layer image in the FIG. 10). In the same way, a search range in a third layer image is set based on the detection result in the second layer, search processing for that search range is performed, and, finally, the object position in the third layer (original image) is specified (refer to detection position in the third layer image in FIG. 10).

Although matching with many templates is needed in normal template matching, in the coarse-to-fine search, the number of matching of templates can be reduced by gradually narrowing the search range from the image with low-resolution (hereinafter, also referred to low-resolution image) to the image with high resolution (hereinafter, also referred to high-resolution image), and the processing time can be shortened.

Recently, for speeding up the processing of template matching using the coarse-to-fine search, a technique in which images after two-dimensional projection viewed from various camera positions (viewpoints) in each layer are compared when creating templates, viewpoints that look similar are grouped based on the similarity of these images, and the number of the templates used for matching is thinned out has been proposed (refer to European Patent No. 2048599, for example).

European Patent No. 2048599 is an example of background art.

If the above-mentioned method is employed, the number of templates that can be thinned out by grouping of the viewpoints is large in places where similar viewpoints are concentrated close to each other and the matching processing can be sped up using the templates, whereas the number of the templates that can be thinned out by grouping of the viewpoints is small in places where similar viewpoints are not concentrated close to each other, and thus accelerating the matching processing using the templates is difficult. In this way, in the above-mentioned method, a large variation occurs in the time required for matching processing between the places where similar viewpoints are concentrated close to each other and the places where similar viewpoints are not concentrated close to each other.

Also, in the above-mentioned method, it is required to successively determine whether there are viewpoints that look similar and, furthermore, if viewpoints that look similar are found, these viewpoints must be grouped, and thus much time is needed for creating templates.

One or more aspects have been made in view of the above-mentioned circumstances and aims to provide a technique for shortening the creation time of templates used for object recognition by template matching.

SUMMARY

A template creation apparatus according to one aspect is a template creation apparatus for creating hierarchical templates for object recognition to be used for template matching, the template creation apparatus including: a viewpoint position creation unit, which is a creation unit configured to create a plurality of approximate spherical shapes in which intervals between vertices are substantially equal and each vertex is set as a viewpoint position, intervals between the viewpoint positions being different for each of the created approximate spherical shapes; and a template creation unit configured to create, for each of the approximate spherical shape, a plurality of templates corresponding to a target object viewed from each of the set viewpoint positions.

In the above-mentioned configuration, templates are created using a plurality of approximate spherical shapes in which intervals between vertices are substantially equal and each vertex is set as a viewpoint position. Here, the intervals between the viewpoint positions set as the vertices of the approximate spherical shapes are different for each approximate spherical shape. For an approximate spherical shape whose viewpoint position interval is wide (in other words, an approximate spherical shape in which the number of viewpoints that are set is small), a template for low-resolution that corresponds to each viewpoint is created based on an image of the target object after two-dimensional projection viewed from each viewpoint position. On the other hand, for an approximate spherical shape whose viewpoint position interval is narrow (in other words, an approximate spherical shape in which the number of the viewpoints that are set is large), a template for high-resolution that corresponds to each viewpoint is created based on an image of the target object after two-dimensional projection viewed from each viewpoint position. In this configuration, unlike the conventional technique, it is not required to perform processing for successively determining whether there are viewpoints that look similar when creating the templates or for collectively grouping the viewpoints that look similar, and thus it is possible to shorten the creation time of the templates compared with the conventional technique.

A template creation method according to another aspect is a template creation method for creating hierarchical templates for object recognition to be used for template matching, the template creation method including: creating a plurality of approximate spherical shapes in which intervals between vertices are substantially equal and each vertex is set as a viewpoint position, intervals between viewpoint positions being different for each of the created approximate spherical shapes; and creating, for each of the approximate spherical shape, a plurality of templates corresponding to a target object viewed from each of the set viewpoint positions.

A computer program according to another aspect is a program for causing a computer to create hierarchical templates for object recognition to be used for template matching, the program causing the computer to: create a plurality of approximate spherical shapes in which intervals between vertices are substantially equal and each vertex is set as a viewpoint position, the intervals between viewpoint positions being different for each of the created approximate spherical shapes; and create, for each of the approximate spherical shapes, a plurality of templates corresponding to a target object viewed from each of the set viewpoint positions.

According to one or more aspects, a technique for shortening a creation time for creating templates to be used for object recognition by template matching.

DETAILED DESCRIPTION

Hereinafter, an embodiment will be described in detail with reference to the drawings. Note that identical elements are given by identical reference signs, and redundant description thereof is omitted. Also, the following embodiment is an example for illustrating the present invention, and it is not intended to limit the present invention to only that embodiment. Furthermore, the present invention may be variously modified without departing from the spirit thereof.

A. Embodiment

A-1. Overall Configuration of Object Recognition Apparatus

Figure 1:
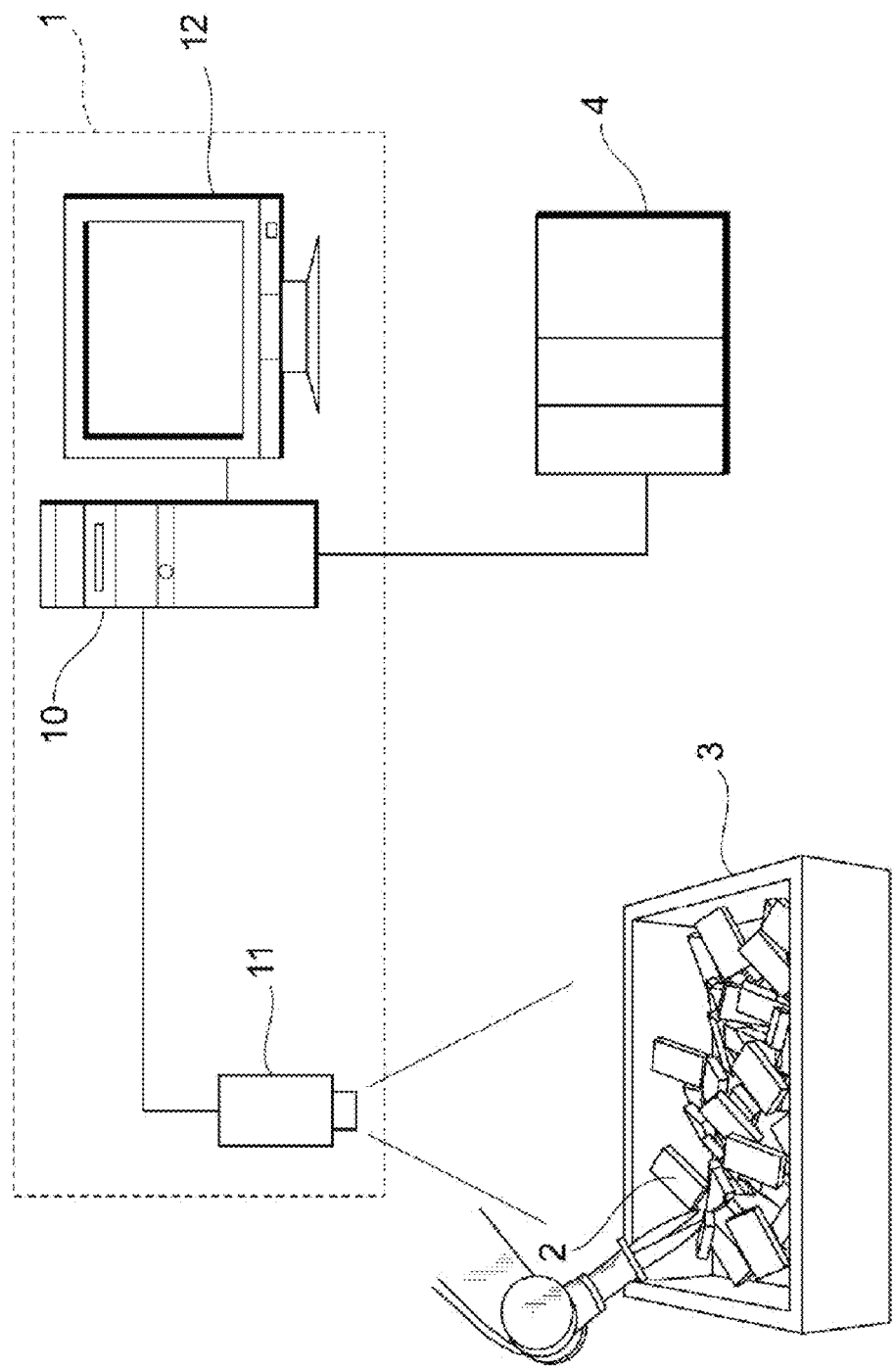
FIG. 1 is a diagram illustrating an overall configuration of an object recognition apparatus.

An overall configuration and an application situation of an object recognition apparatus according to an embodiment will be described, with reference to FIG. 1.

An object recognition apparatus 1 is installed in, for example, a production line having a picking system, and is a system that recognizes (that performs three-dimensional object recognition of) a position and orientation of an object 2 on a tray 3 by template matching, using an image imported from a camera 11. On the tray 3, objects 2 that are recognition targets (hereinafter, referred to "target object") are piled in a heap. The object recognition apparatus 1 imports an image from the camera 11 at a predetermined time interval, performs processing for recognizing the position and orientation of each target object 2 included in the image using an image processing apparatus 10, and outputs the recognition result to, for example, a PLC (Programable Logic Controller) 4 or a display 12. The recognition result output from the object recognition apparatus 1 is used for, for example, controlling a picking robot, controlling a processing apparatus or a printing apparatus, and inspecting or measuring the target object 2.

A-2. Hardware Configuration

Figure 2:
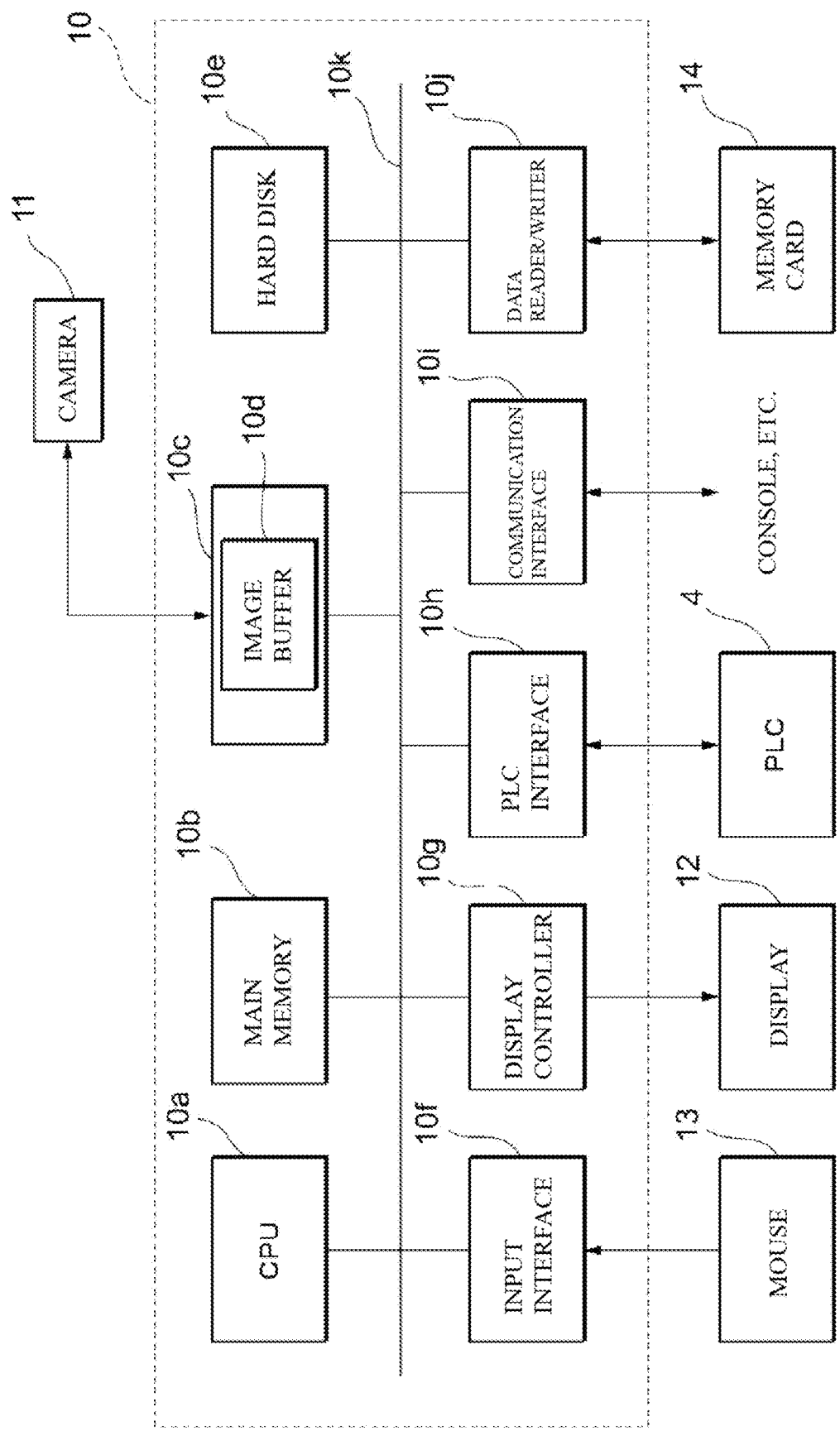
FIG. 2 is a diagram illustrating a hardware configuration of an object recognition apparatus.

A hardware configuration of the object recognition apparatus 1 will be described, with reference to FIG. 2. The object recognition apparatus 1 is mainly constituted by the camera 11 and the image processing apparatus 10.

The camera 11 is an image capturing device for importing a digital image of the target object 2 to the image processing apparatus 10, and a CMOS (Complementary Metal-Oxide-Semiconductor) camera or a CCD (Charge-Coupled Device)

is preferably used therefor. The format of the input image, such as resolution, color/monochrome, still image/moving image and tone, is arbitrary, and can be appropriately selected according to the type of target object 2 and the purpose of sensing. In a case where a special image other than a visible light image, such as an X-ray image or a thermographic image, is used for object recognition and inspection, a camera suitable for that image may be used.

The image processing apparatus 10 includes a CPU (Central Processing Unit) 10*a*, a main memory 10*b* used as a work memory, a hard disk 10*e* that is a fixed storage unit, a camera interface 10*c*, an input interface 10*f*, a display controller 10*g*, a PLC interface 10*h*, a communication interface 10*i*, and a data reader/writer 10*j*. These units are connected, via a bus 10*k*, so as to be able to perform data communication with each other.

The camera interface 10*c* is a part that mediates data transmission between the CPU 10*a* and the camera 11, and may have an image buffer 10*d* for temporarily accumulating image data from the camera 11. The input interface 10*f* mediates data transmission between the CPU 10*a* and an input unit. The input unit may include a mouse 13, a keyboard, a touch panel, a jog controller, and the like. The display controller 10*g* is connected to the display 12 such as an LCD monitor and controls display on that display. The PLC interface 10*h* mediates data transmission between the CPU 10*a* and the PLC 4. The communication interface 10*i* mediates data transmission between the CPU 10*a* and a console, or between the CPU 10*a* and a personal computer, a server apparatus and the like. The data reader/writer 10*j* mediates data transmission between the CPU 10*a* and a memory card 14 that is a recording medium.

The image processing apparatus 10 can be constituted by a computer having a general-purpose architecture, and executes various processing by the CPU 10*a* loading a program stored in the hard disk 10*e* or the memory card 14. Such a program is distributed in a state of being stored in a computer-readable recording medium such as the memory card 14 and an optical disk, or is provided through the Internet. Note that a program according to an embodiment may be provided as a stand-along application program or may be provided as a module incorporated in part of another program. Also, some or all of the processing executed by the program may be executed by a dedicated circuit such as an ASIC.

A-3. Configuration of Image Processing Apparatus

Figure 3:
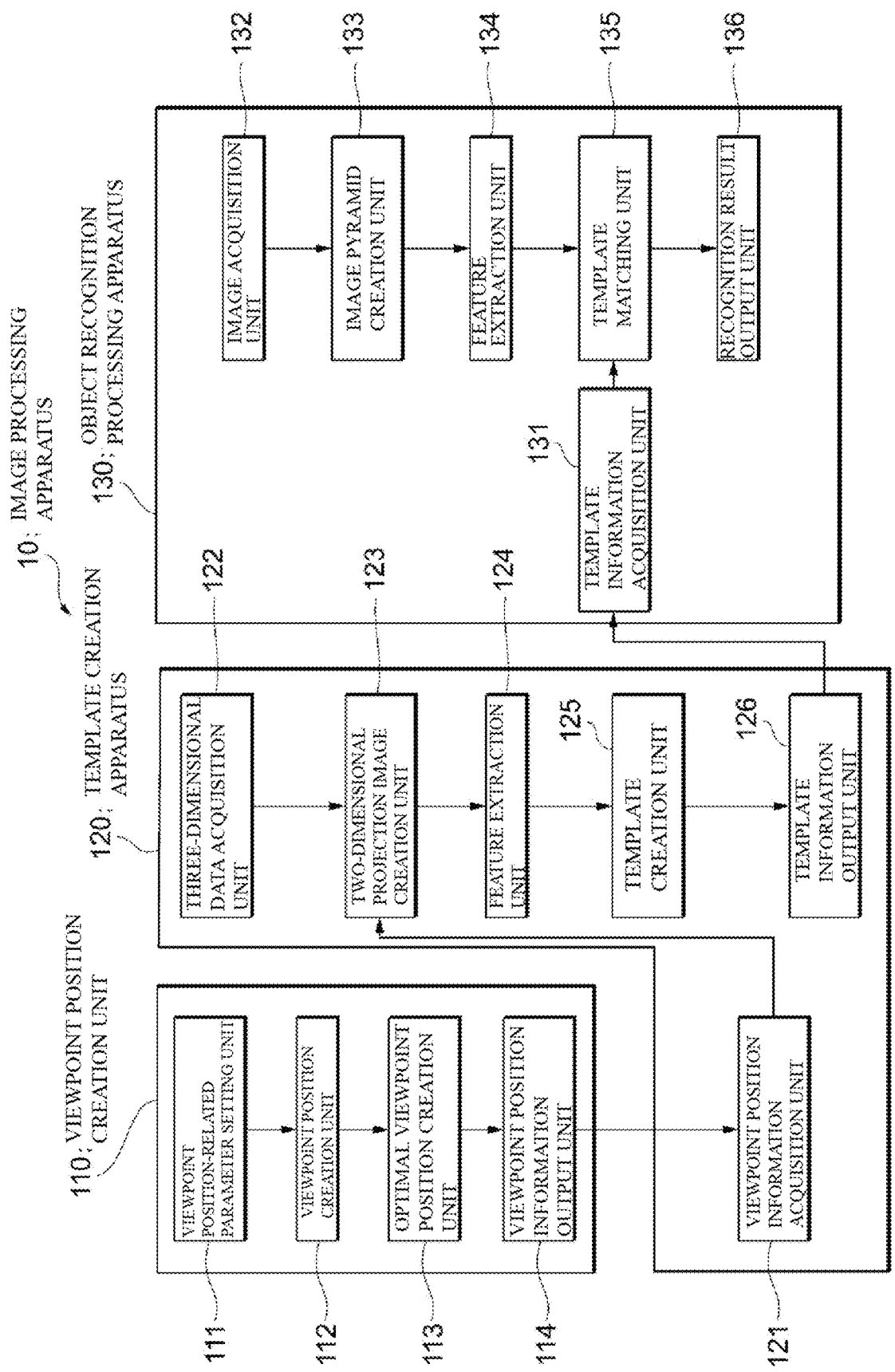
FIG. 3 is a diagram illustrating a configuration of an image processing apparatus.

FIG. 3 shows a configuration of the image processing apparatus 10. The image processing apparatus 10 operates as a viewpoint position creation apparatus 110, a template creation apparatus 120, and an object recognition processing unit 130, by the CPU 10*a* loading and executing a program stored in the hard disk 10*e* or the like.

The viewpoint position creation apparatus 110 creates (sets) all of the viewpoint positions necessary for creating a template, and includes a viewpoint position-related parameter setting unit 111, a viewpoint position creation unit 112, an optimal viewpoint position creation unit 113, and a viewpoint position information output unit 114.

The template creation apparatus 120 creates templates to be used in the object recognition processing and includes a viewpoint position information acquisition unit 121, a three-dimensional CAD data acquisition unit 122, a two-dimensional projection image creation unit 123, a feature extraction unit 124, a template creation unit 125, and a template information output unit 126.

The object recognition processing unit 130 by performing template matching using the templates created/stored by the template creation apparatus 120 on an image imported from the camera 11, recognizes an object in the image. The object recognition processing apparatus 130 includes a template information acquisition unit 131, an image acquisition unit 132, an image pyramid generation unit 133, a feature extraction unit 134, a template matching unit 135, and a recognition result output unit 136. The viewpoint position creation apparatus 110, the template creation apparatus 120, and the object recognition processing apparatus 130 will be described later in detail.

A-4. Principal for Creating Viewpoint Position

A-4-1. Usage of Approximate Spherical Shape

Figure 4:
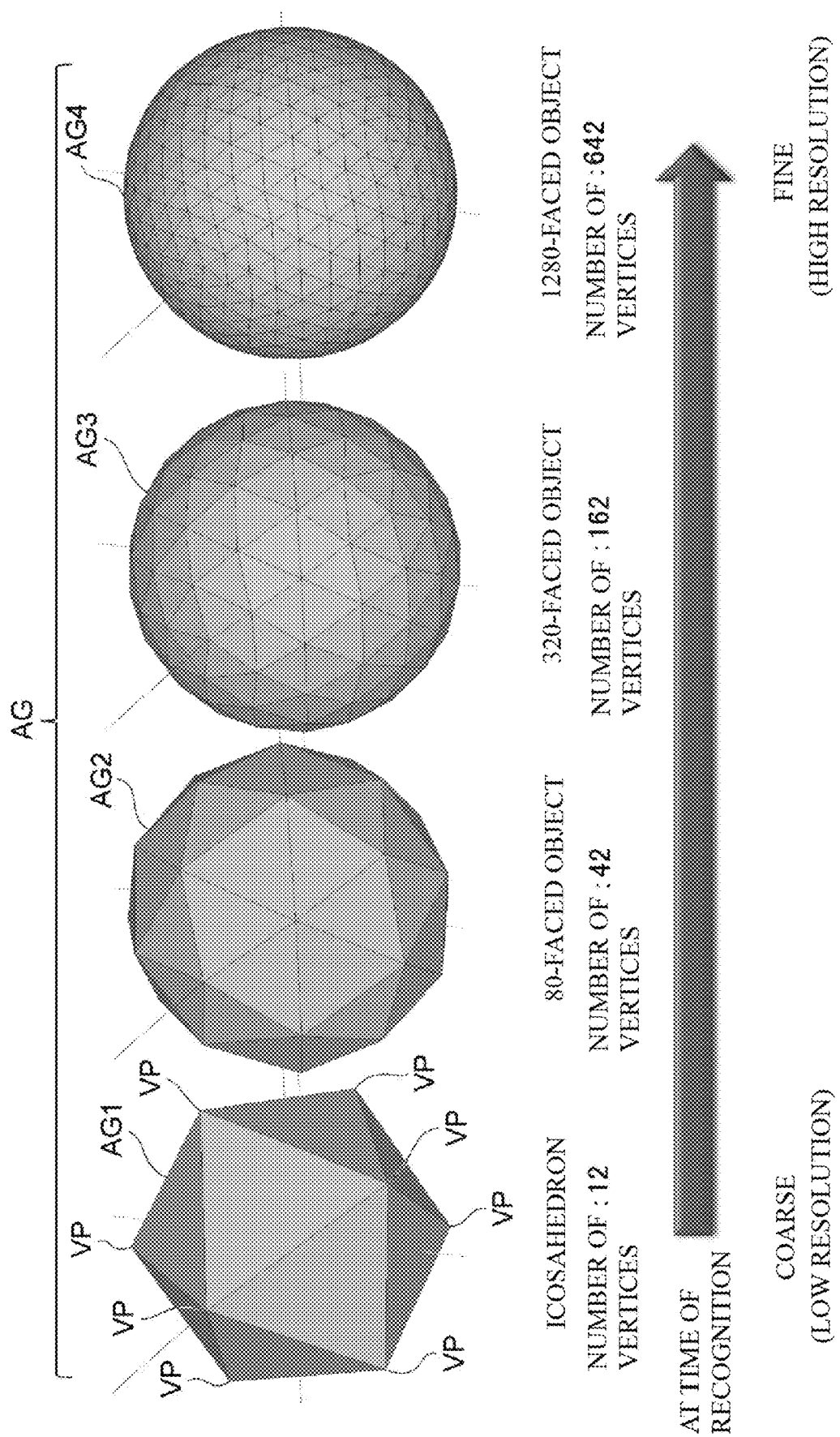
FIG. 4 is a diagram illustrating a principal for creating viewpoint positions.

FIG. 4 is a diagram showing a principal for creating the viewpoint position according to an embodiment.

In an embodiment, vertices of an approximate spherical shape AG constituted by a polyhedron are used as viewpoint positions VP (refer to an approximate spherical shape AG1 shown in FIG. 4) so that the distances between the viewpoints is substantially equal. Then, when shifting from the case of creating a template with low resolution to the case of creating a template with high resolution, an approximate spherical shape AG is used in which the number of viewpoints (that is, the number of vertices) increases as the template to be created changes. Specifically, an icosahedron AG1 (number of vertices=12) is used as the approximate spherical shape AG used when creating the template with the lowest resolution (hereinafter, also referred to a "first template"), and an 80-faced object AG2 (number of vertices=42) is used as the approximate spherical shape AG used when creating a template (hereinafter, also referred to a "second template") with higher resolution than the first template. In the same way, a 320-faced object AG3 (number of vertices=162) is used as the approximate spherical shape AG used when creating a template with higher resolution (hereinafter, also referred to a "third template") than the second template, and a 1280-faced object AG4 (number of vertices=642) is used as the approximate spherical shape AG used when creating a template with the highest resolution (hereinafter, also referred to a "fourth template"). Note that, in FIG. 4, the case where the number of hierarchies of the templates is "4" is illustrated, but the number of hierarchies can be freely set and changed. Also, as a method for deriving the approximate spherical shape AG, a geodesic dome using an alternate division method, a triacon division method or the like is known, but an embodiment is, naturally, not intended to be limited to a geodesic dome as long as an approximate spherical shape having a plurality of vertices is used.

Here, when referring to the association of the vertices between the approximate spherical shapes AG1 and AG 2, between the approximate spherical shapes AG2 and AG3, and between the approximate spherical shapes AG3 and AG4, the number of viewpoints of the approximate spherical shape AG corresponding to the higher-resolution template (hereinafter, also referred to as "slave viewpoints"), which are associated with the viewpoint of the approximate spherical shape AG corresponding to the lower-resolution template (hereinafter, also referred to as "master viewpoints"), can be made substantially equally at three or four viewpoints. Furthermore, by selecting a master viewpoint in each approximate spherical shape AG and three or four of the slave viewpoints associated with the master viewpoint that are close in distance to that master viewpoint and setting the slave viewpoints with respect to the master viewpoint, the change in appearance viewed from each viewpoint tends to be uniform. In this manner, in an embodiment using each vertex of the approximate spherical shape AG as a viewpoint position, processing such as grouping viewpoints that look similar does not need to be performed when creating the templates, unlike the conventional technique, and thus the creation time of the templates can be shortened.

A-4-2. Optimization of Angle of Approximate Spherical Shape

Figure 5:
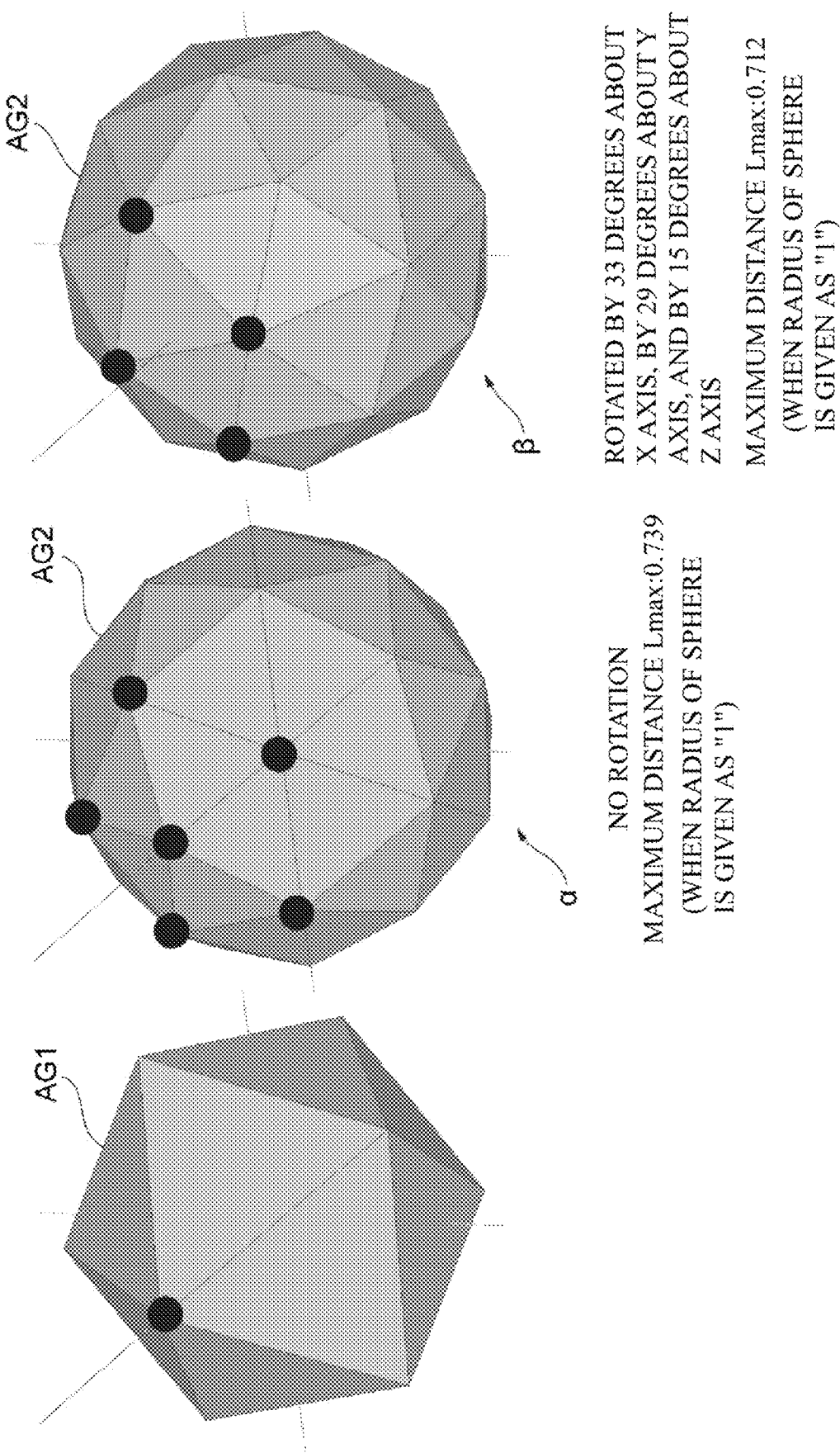
FIG. 5 is a diagram illustrating association of vertices between approximate spherical shapes.

FIG. 5 is a diagram showing association of vertices between the approximate spherical shapes AG1 and AG2, with α showing the approximate spherical shape AG2 in a case where it is not rotated, and ß shows the approximate spherical shape AG2 in the case where the spherical shape is rotated by a predetermined amount. Note that, in the following description, the radius of the sphere is assumed to be "1".

As shown in α, in the case where the approximate spherical shape AG2 is not rotated, the maximum distance Lmax between the master viewpoint of the approximate spherical shape AG1 and the slave viewpoint of the approximate spherical shape AG2 is "0.739", whereas, as shown in ß, when the approximate spherical shape AG2 is rotated by the predetermined amount (specifically, rotated by 33 degrees about the X axis, by 29 degrees about the Y axis, and by 15 degrees about the Z axis), the maximum distance Lmax between the master viewpoint of the approximate spherical shape AG1 and the slave viewpoint of the approximate spherical shape AG2 is "0.712".

Here, the shorter the distance from the master viewpoint to the slave viewpoint is, the smaller the change (difference) in appearance of the target object of the matching processing is. If the change in the appearance of the target object is small, in the coarse-to-fine search, a difference between the matching processing executed with the high-resolution template and the matching processing executed with the low-resolution template will be small, and thus a decrease in the recognition accuracy can be suppressed.

Based on the above, in an embodiment, firstly, among a plurality of slave viewpoints associated with a master viewpoint, for a slave viewpoint whose distance from its master viewpoint is the longest, the distance Lmax (that is, the maximum distance) between the slave viewpoint and the master viewpoint is acquired. Then, a rotation angle of the approximate spherical shape AG2 is acquired so that the maximum distance Lmax from the slave viewpoint to the associated the master viewpoint will be a minimum and furthermore the number of the slave viewpoints associated with the master viewpoints will be approximately the same (in an embodiment, 3 or 4 viewpoints), and then the approximate spherical shape AG2 is rotated by the acquired rotation angle. By performing the rotation in this manner, the distance from the master viewpoint to the associated slave viewpoint will be shorter than that in the case where rotation is not performed, the change in the appearance of the target object of the matching processing will be small, and thus a decrease in the recognition accuracy can be suppressed. Note that, instead of acquiring the rotation angle of the approximate spherical shape AG at which the maximum distance Lmax from the slave viewpoint to the associated master viewpoint is a minimum, the rotation angle of the approximate spherical shape AG at which an average distance Lave from the slave viewpoint to the associated master viewpoint is a minimum may be acquired.

A-5. Processing of Viewpoint Position Creation

Figure 6:
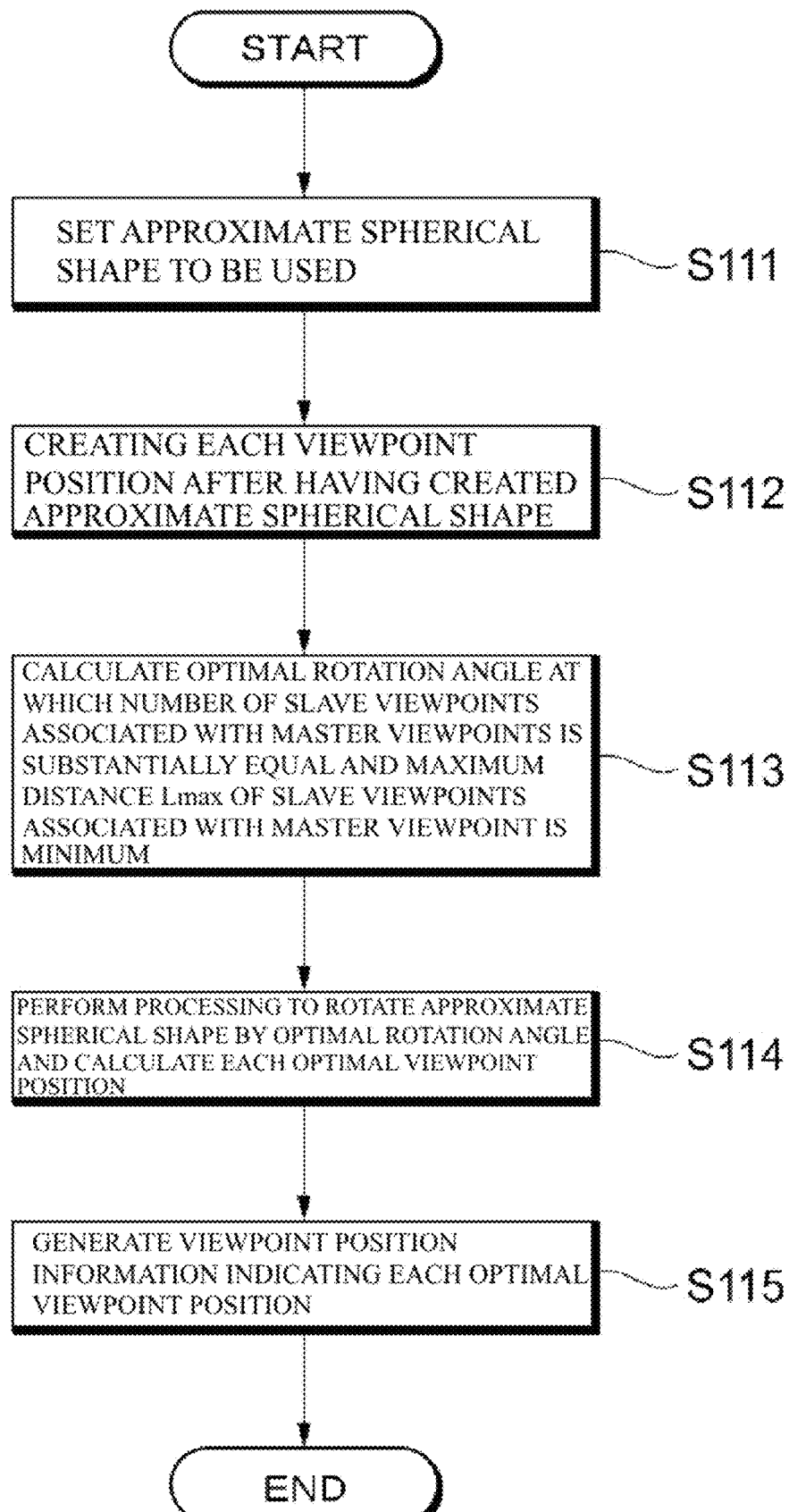
FIG. 6 is a flowchart illustrating processing for creating viewpoint positions.

Hereinafter, processing of the viewpoint position creation performed by the viewpoint position creation apparatus 110 will be described, according to the flowchart shown in FIG. 6.

The viewpoint-position-related parameter setting unit 111 determines (sets) which approximate spherical shape AG to use for determining the viewpoint positions (step S111). As one example, a plurality of approximate spherical shapes AG to be used such as the icosahedron AG1 and the 80-faced object AG2 shown in FIG. 4 are set, by a user appropriately operating an operation button or the like. Naturally, the setting method of the approximate spherical shapes AG to be used is not limited thereto. For example, based on information related to the size and shape of the target object that is input (target object information), the viewpoint position-related parameter setting unit 111 may automatically calculate a viewpoint position interval that is appropriate for the target object or the like, and may set a plurality of approximate spherical shapes AG to be used according to the acquired viewpoint position interval and the like.

The viewpoint position creation unit 112 creates viewpoint positions (that is, vertices) for the plurality of approximate spherical shapes AG that were set by the viewpoint position-related parameter setting unit 111 (step S112). For example, in the case where the icosahedron AG1, the 80-faced object AG2 and the like shown in FIG. 4 have been set by the viewpoint-position-related parameter setting unit 111, the viewpoint position creation unit 112 creates (sets) a viewpoint position for each vertex of the icosahedron AG1, the 80-faced object AG2 and the like. The viewpoint position creation unit 112 creates viewpoint positions for each approximate spherical shape AG from the approximate spherical shape AG whose viewpoint position interval is wide (for example, the icosahedron AG1) to the approximate spherical shape AG whose viewpoint position interval is narrow (for example, the 1280-faced object AG4) and then outputs the viewpoint positions of each of the approximate spherical shapes AG to the optimal viewpoint position creation unit 113.

The viewpoint position creation unit 113 calculates a rotation angle (hereinafter, referred to "optimal rotation angle") at which the number of slave viewpoints associated with the master viewpoint will be approximately equal and at which the maximum distance Lmax from the slave viewpoint to the associated master viewpoint (or the average distance Lave from the slave viewpoint to the associated the master viewpoint) will be a minimum (step S113). As one example, the above-mentioned maximum distance Lmax in the case where the approximate spherical shape AG is rotated by predetermined angles a, b, c about the X axis, the Y axis, and the Z axis respectively is acquired. Then, the optimal viewpoint position creation unit 113 sequentially changes the predetermined angles a, b, and c for respective axis, then, based on the above-mentioned maximum distance Lmax acquired at the predetermined angles, acquires the correlation between the rotation angles a, b, and c and the maxim distance Lmax, and calculates the predetermined angles a, b, and c at which the above-mentioned maximum distance Lmax will be a minimum as the optimal rotation angles. Then, the optimal viewpoint position creation unit 113 calculates the optimal viewpoint positions by rotating each approximate spherical shape AG by the calculated optimal rotation angles with respect to the viewpoint positions of each approximate spherical shape AG output from the viewpoint position creation unit 112 (step S114). The optimal viewpoint position creation unit 113 outputs the calculated optimal viewpoint positions to the viewpoint position information output unit 114.

The viewpoint position information output unit 114 generates viewpoint position information indicating the optimal viewpoint positions, for the plurality of optimal viewpoint positions provided from the optimal viewpoint position creation unit 113 (step S115), and outputs the generated information to the template creation apparatus 120.

A-6. Template Creation Processing

Figure 7:
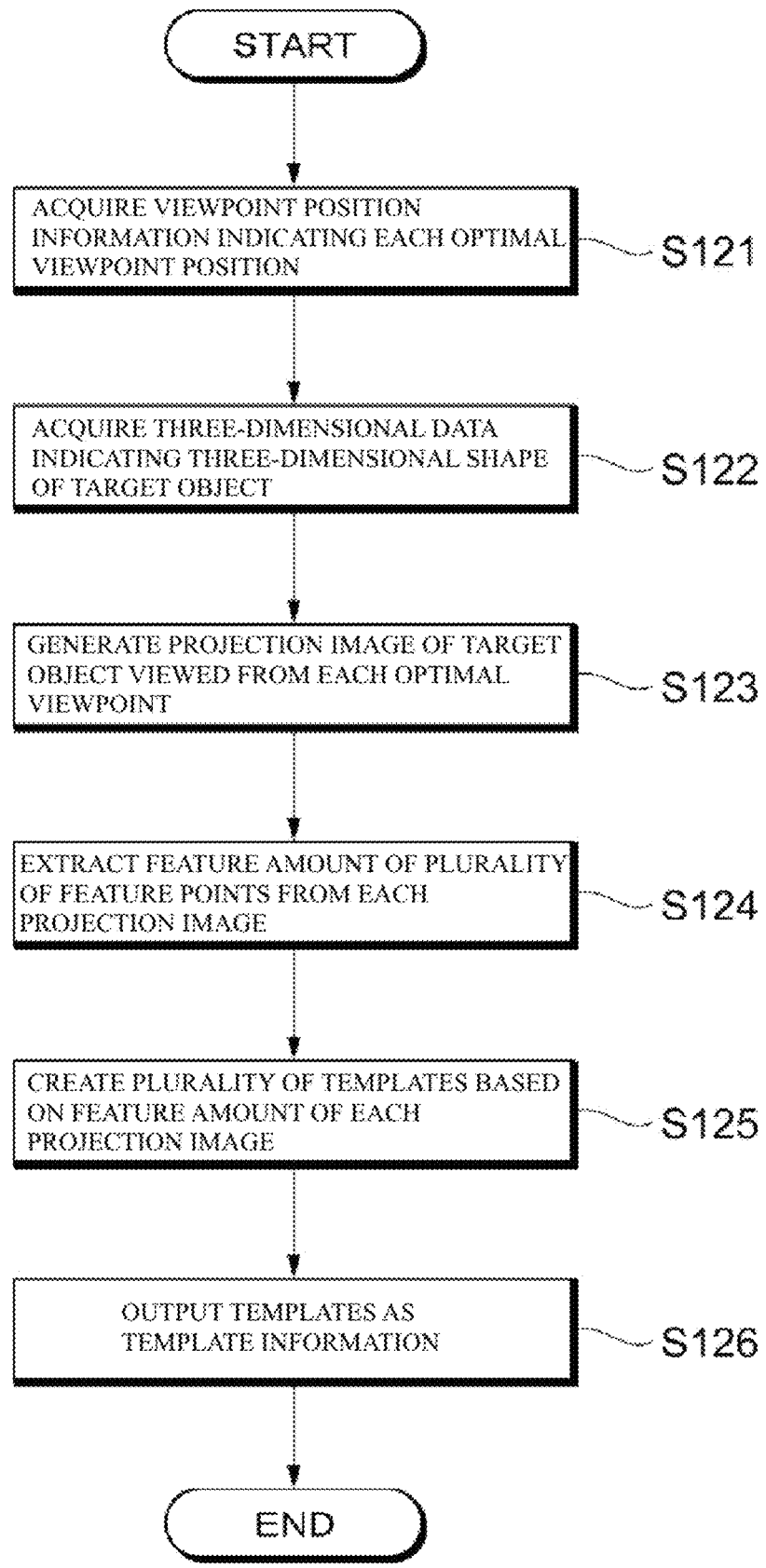
FIG. 7 is a flowchart illustrating processing for creating templates.

Next, template creation processing executed by the template creation apparatus (template creation unit) 120 will be described, according to the flowchart shown in FIG. 7.

The viewpoint position information acquisition unit 121 acquires viewpoint position information indicating each optimal viewpoint position that is output from the viewpoint position information output unit 114 of the viewpoint position creation apparatus 110 (step S121).

The three-dimensional CAD data acquisition unit 122 acquires three-dimensional data indicating the three-dimensional shape of the target object (step S122). The three-dimensional CAD data acquisition unit 122 can acquire any three-dimensional data that allows the target object to be recognized as a solid figure, and, in an embodiment, acquires three-dimensional CAD data. The three-dimensional CAD data acquisition unit 122 can acquire the three-dimensional CAD data from an external three-dimensional CAD server or the like, and can acquire the three-dimensional CAD data from a memory (not shown).

Using the viewpoint position information acquired by the viewpoint position information acquisition unit 121 and the three-dimensional data acquired by the three-dimensional CAD data acquisition unit 122, the two-dimensional projection image creation unit 123 generates a projection image (that is, two-dimensional image) of the target object viewed from each optimal viewpoint (step S123).

The feature extraction unit 124 extracts a feature amount of a plurality of feature points, from the projection image of each optimal viewpoint (step S124). As the feature amount, for example, a pixel value (luminance), a luminance gradient direction, a quantization gradient direction, HOG (Histograms of Oriented Gradients), HAAR-Like, SIFT (Scale-Invariant Feature Transform) and the like can be used. The luminance gradient direction represents a direction (angle) of a gradient of luminance in a local region centered on feature point as continuous values, and the quantization gradient direction represents the direction of the gradient of luminance in the local region centered on the feature point as discrete values (for example, holding 8 directions with 1-byte information 0 to 7).

The template creation unit 125 creates a plurality of templates, based on the feature amount of the projection image of each optimal viewpoint extracted by the feature extraction unit 124 (step S125). Here, the template is data indicating the image feature of the target object, and any format can be used for the template. For example, an array describing the feature amount of the feature point in the projection image can be used as the template.

As described above, in an embodiment, the coarse-to-fine search is performed using images of each layer whose resolutions gradually differ (image pyramid), and thus a template needs to be created for each layer. Therefore, the template creation unit 125 creates a plurality of templates whose resolutions differ in each layer. That is, the template creation unit 125 creates the plurality of templates by using the projection image viewed from each optimal viewpoint set as the vertex of the corresponding approximate spherical shape AG (for example, the icosahedron) in each layer.

For each optimal viewpoint, the template information output unit 126 outputs, to the object recognition processing apparatus 130, the templates created by the template creation unit 125 as template information.

A-7. Object Recognition Processing

Figure 8:
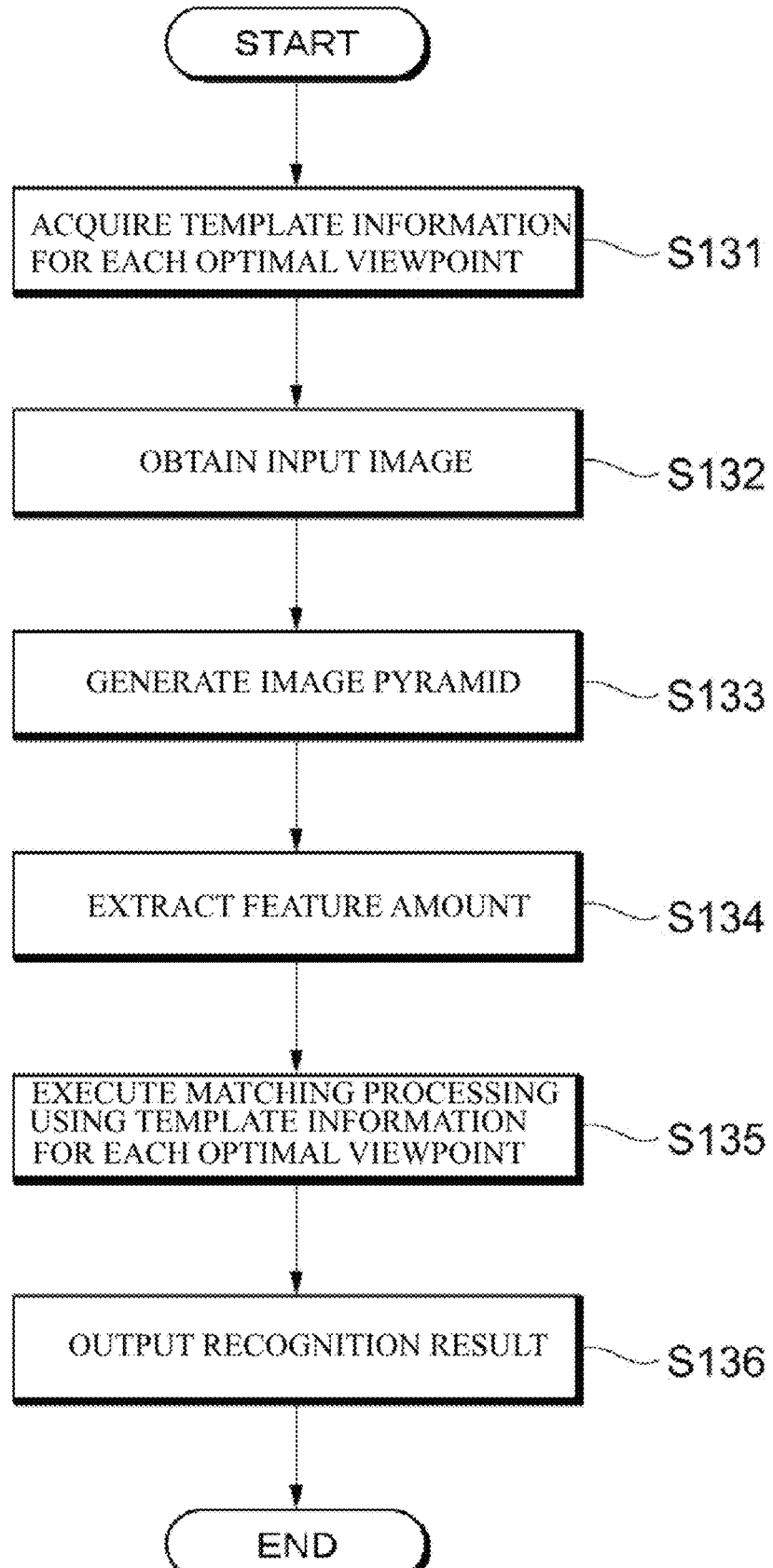
FIG. 8 is a flowchart illustrating processing for object recognition.

Next, object recognition processing executed by the object recognition processing apparatus 130 will be described, according to the flowchart shown in FIG. 8.

First, the template information acquisition unit 131 acquires the template information output from the template information output unit 126 of the template creation apparatus 120 and provides the template information to the template matching unit 135 (step S131).

The image acquisition unit 132 imports the input image from the camera 11 (step S132). It is assumed that a target object in an arbitrary orientation is captured in this image.

The image pyramid generation unit 133 generates a low-resolution image from the imported input image (original image) and creates an image pyramid (step S133). For example, the image pyramid constituted by an image of 160 pixels×120 pixels as the first layer image, an image of 320 pixels×240 pixels as the second layer image and the like can be constituted.

The feature extraction unit 134 executes feature extraction processing for each layer image that constitutes the image pyramid (step S134). The extracted feature amount is the same type of the feature amount of the template, with a quantization gradient direction being given as an example. As a result of the feature extraction processing on the first layer image that is the uppermost layer (the lowest-resolution image), an image that has the same resolution of the first layer image and has feature amount data extracted at each pixel position of the first layer image as a pixel value (hereinafter, also referred to a "first layer feature image") can be acquired. Similarly, as a result of the feature extraction processing on the second layer image, a second layer feature image can be acquired.

The template matching 135 performs template matching using the template information of each optimal viewpoint provided from the template information acquisition unit 131 and the feature amount, calculated by the feature extraction unit 134, corresponding to the template information (step S135).

Specifically, the template matching unit 135 firstly performs matching processing using the first layer feature image and the template of each optimal viewpoint for the first layer. As a result of the matching processing performed using the template of each optimal viewpoint for the first layer, if the template matching unit 135 detects a template to be a correct candidate, the template matching unit 135 sets a search range for the second layer feature image based on the detection result and performs matching processing using the second layer feature image and the template of each optimal viewpoint for the second layer. If a third layer image and a fourth layer image exist, the same processing is performed for these layer images. For example, if the third layer image exists, the template matching unit 135 sets a search range for the third layer feature image based on the mating processing result in the second layer image and performs matching processing using the third layer feature image and the template of each optimal viewpoint for the third layer. As a result of performing such a processing, it is possible to recognize an existence position of the object at the lowest layer (in this case, at the fourth layer).

After the template matching unit 135 has recognized the existence position and orientation of the target object, the template matching unit 135 outputs recognition information indicating the recognition result to the recognition result output unit 136. The recognition result output unit 136 outputs the recognition information provided from the template matching unit 135 to an external apparatus or an LCD panel (step S136). The recognition information is used for, for example, inspection and measurement of the target object, control of a picking robot and the like.

Figure 9A:
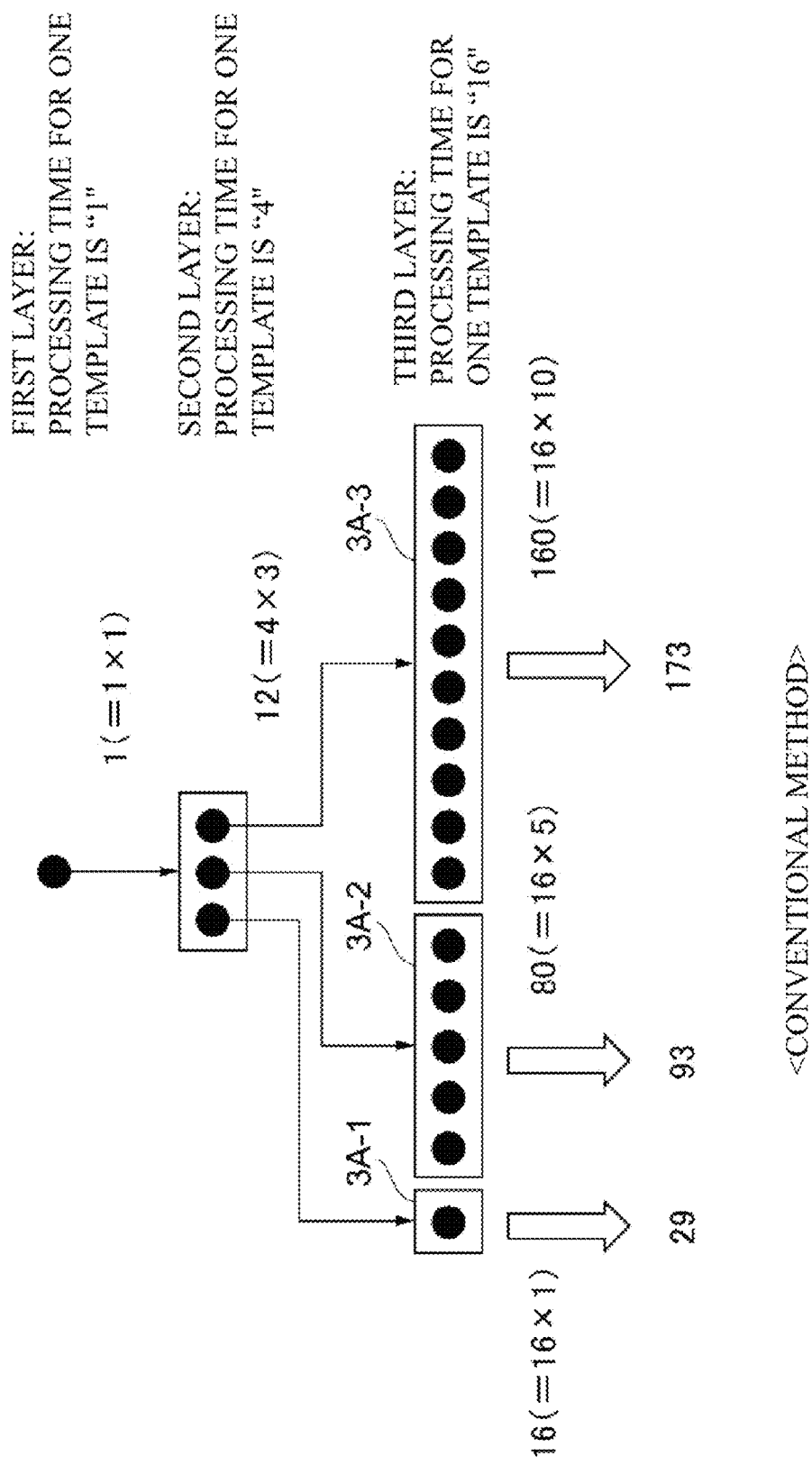
FIG. 9A is a diagram illustrating a processing time for template matching in the case of using a conventional method.
Figure 9B:
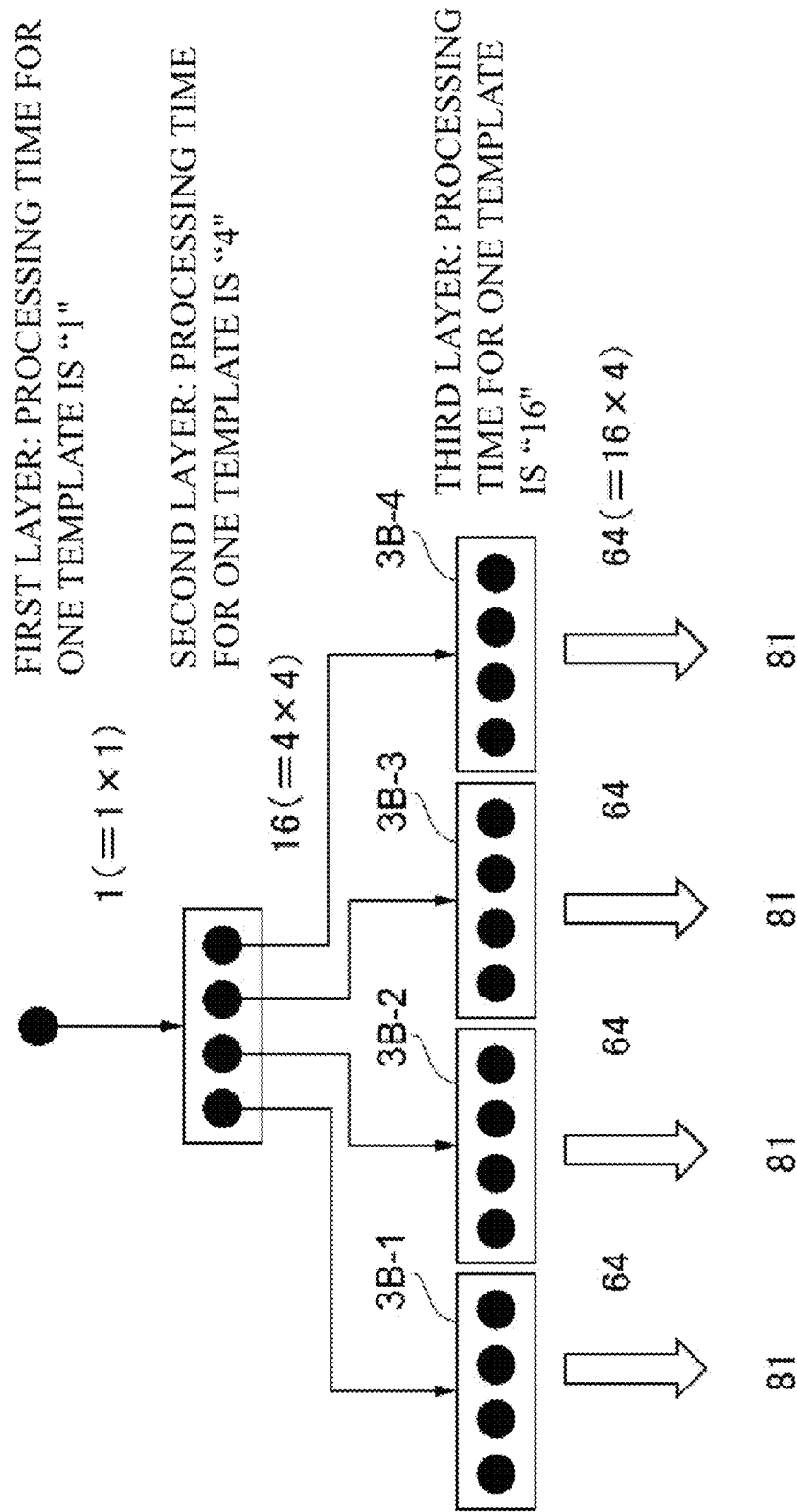
FIG. 9B is a diagram illustrating processing time for template matching in the case of using a method of an embodiment.
Figure 10:
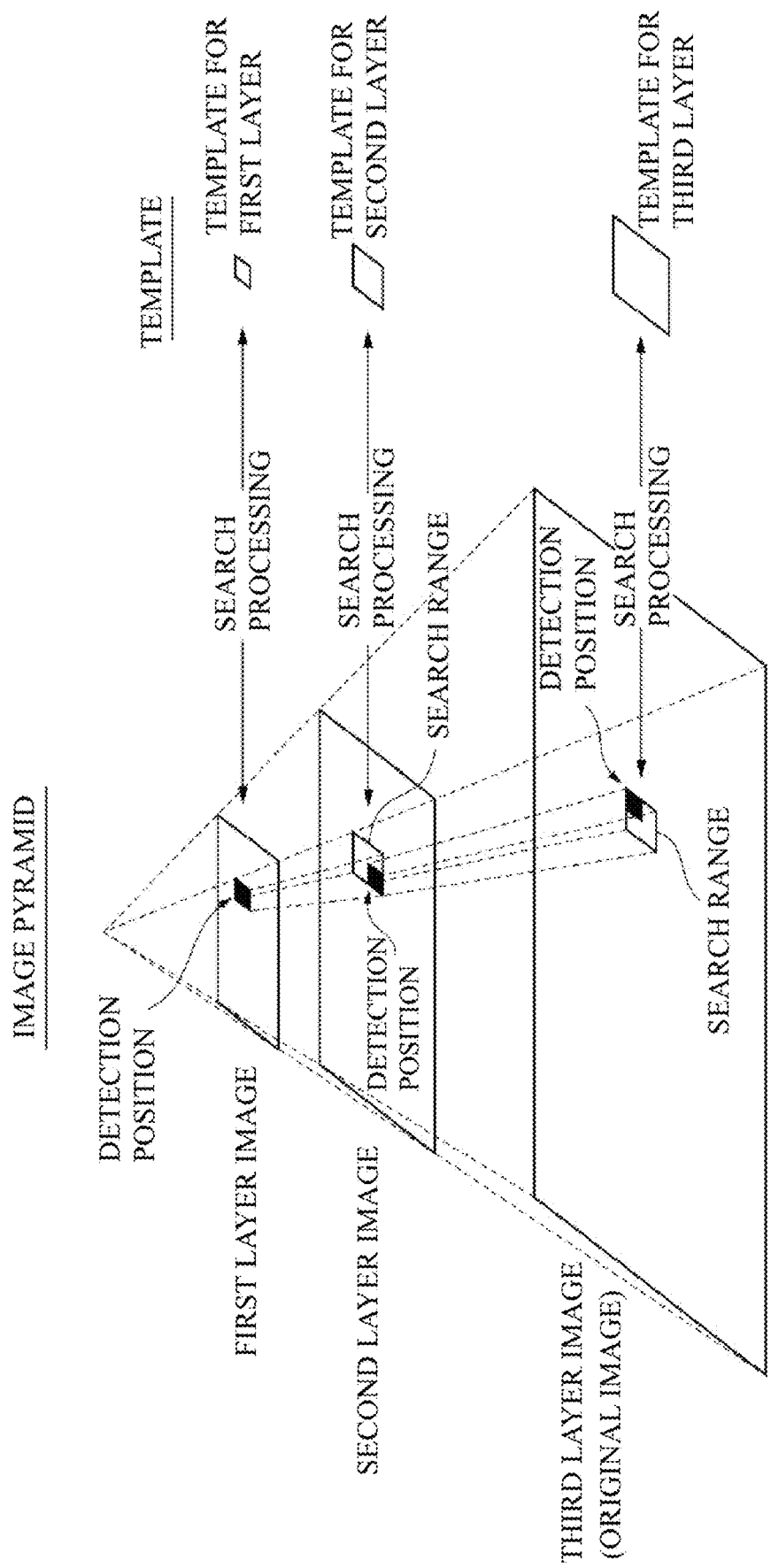
FIG. 10 is a diagram illustrating a basic concept of a coarse-to-fine search using an image pyramid.

Here, FIG. 9A is a diagram illustrating the processing time for template matching in the case of using a conventional method, and FIG. 9B is a diagram illustrating the processing time for template matching in the case of using the method of an embodiment. Note that, in FIGS. 9A and 9B, it is assumed that the resolution of the first layer is the lowest, the second layer has a resolution that is four times higher than that of the first layer, and furthermore, the third layer has a resolution that is four times higher than that of the second layer. Also, the number of feature points included in the template of each layer increases by four times each, shifting from the upper layer to the lower layer, and thus it is assumed that the processing time for template matching also becomes longer by four times each, shifting from the upper layer to the lower layer. That is, if the processing time for one template in the first layer is "1", the processing time for one template in the second layer will be "4", and the processing time for one template in the third layer will be "16".

In the conventional method, processing is sped up by grouping viewpoints after acquiring the similarity between templates and by reducing the number of the templates used for matching processing. In the method in which grouping the viewpoints after acquiring the similarity between the templates is performed, as shown in FIG. 9A, for example, even if a search range has been narrowed to the search range in which the number of the templates is "3" in the second layer, it is required to perform template matching in the third layer in each of the ranges, namely, a search range 3A-1 in which the number of the templates is "1", a search range 3A-2 in which the number of the templates is "5", and a search range 3A-3 in which the number of the templates is "10". Because the processing time for one template in the third layer is "16", the processing time in each of the search ranges 3A-1 to 3A-3 is respectively represented by 16 (=16×1), 80 (=16×5), and 160 (=16×10). Accordingly, the total processing time in each of the search ranges 3A-1 to 3A-3 (that is, total processing time from the first layer to the third layer) will be respectively 29 (=16+12+1), 93 (=80+12+1), and 173 (=160+12+1). As stated above, when the conventional method is used, the processing time required for matching the templates (that is, recognition of the position and orientation of the target object) greatly varies.

On the other hand, in the method of an embodiment, the number of slave viewpoints associated with a master viewpoint is equal at approximately three or four viewpoints and the optimal viewpoint position is set so that distances to each of these viewpoints will be substantially constant (equidistant interval), and matching processing is performed using the template created for each optimal viewpoint. Accordingly, as shown in FIG. 9B, when a search range has been narrowed to the search range in which the number of the templates is "4" in the second layer, in the third layer, template matching is performed for the search ranges of 3B-1 to 3B-4 in which the number of the templates are the same ("4" in FIG. 9B). Because the processing time for one template in the third layer is "16", the processing time in each of the search ranges 3B-1 to 3B-4 is respectively represented by 64 (=16×4), and thus the total processing time in each of the search ranges 3B-1 to 3B-4 will be 81 (=64+16+1). As describe above, when the method of an embodiment is used, the processing time required for matching the templates will be substantially equal.

As described above, according to an embodiment, the template of each resolution is created by the vertices of the approximate spherical shape AG being set as viewpoint positions. Thus, unlike a conventional technique, when the templates are created, processing for determining the similarity of the appearance viewed from each viewpoint and grouping the viewpoints does not need to be performed, and thus it is possible to shorten the creation time of the templates.

In addition, according to an embodiment, the number of slave viewpoints associated with a master viewpoint is substantially equal at three or four viewpoints and the distances to each of these viewpoints are substantially constant. The number of the viewpoints allocated to each search range is substantially equal, and thus the processing time required for matching the template in each search range is also substantially equal.

In addition, according to an embodiment, the rotation angle of the approximate spherical shape AG2 is acquired so that the maximum distance Lmax between the slave viewpoint and the master viewpoint associated with that slave viewpoint (or the average distance Lave between the slave viewpoint and the master viewpoint associated with that slave viewpoint) will be a minimum, and furthermore, so that the number of the slave viewpoints associated with the master viewpoint will be substantially equal, and then the approximate spherical shape AG2 is rotated by the acquired rotation angle. By performing the rotation in this manner, the distance from the master viewpoint to the associated slave viewpoint will be shorter than that in the case where the rotation is not performed, the change in the appearance of the target object of the matching processing will be small, and thus a decrease in the recognition accuracy can be suppressed.

B. Other Embodiments

In the above-mentioned embodiment, the viewpoint position interval that is appropriate for the target object and the like are automatically calculated, based on the target object information related to the size and shape of the input target object, and the plurality of approximate spherical shapes AG to be used are set according to the calculated viewpoint position interval, but, the same set of the approximate spherical shapes AG (for example, the approximate spherical shapes AG1 to AG4 shown in FIG. 4) may be always used, regardless of the target object.

In the present specification, "unit" does not simply means a physical configuration, and may include the case in which the processing executed by a "unit" is realized by software. Also, the processing executed by one "unit" or one apparatus may be realized by two or more physical configurations or apparatuses, and the processing executed by two or more physical configurations or apparatuses may be realized by one physical configuration or one apparatus.

The above-mentioned processing in the present specification may be modified so as to be performed in any order or in parallel, to the extent that inconsistencies in terms of contents of processing do not arise.

A program that implements various types of processing described in the present specification may be stored in a recording medium. With use of this recording medium, the above-mentioned program can be installed in each apparatus constituting the image processing apparatus 10. Here, the recording medium in which the above-mentioned program is stored may be a non-transitory recording medium. The non-transitory recording medium is not limited to a specific medium, and may be a recording medium such as a CD-ROM, for example.

Additional Remark 1

A template creation apparatus that includes at least one memory and at least one hardware processor connected to the memory and creates hierarchical templates for the object recognition used for template matching, the hardware processor, by executing a predetermined program stored in the memory, executes processing as:

a viewpoint position creation unit, which is a creation unit configured to create a plurality of approximate spherical shapes in which intervals between vertices are substantially equal and each vertex is set as a viewpoint position, intervals between viewpoint positions being different for each of the created approximate spherical shapes; and a template creation unit configured to create, for each of the approximate spherical shape, a plurality of templates corresponding to a target object viewed from each of the set viewpoint positions.

Additional Remark 2

A template creation method for creating hierarchical templates for object recognition to be for template matching, using at least one hardware processor, the hardware processor:

creating a plurality of approximate spherical shapes in which intervals between vertices are substantially equal and each vertex is set as a viewpoint position, intervals between the viewpoint positions being different for each of the created approximate spherical shapes; and creating, for each of the approximate spherical shape, a plurality of templates corresponding to a target object viewed from each of the set viewpoint positions.

The invention claimed is:

1. A template creation apparatus for creating hierarchical templates for object recognition used for template matching, the template creation apparatus comprising a processor configured to perform operations comprising:

operation as a viewpoint position creation unit configured to create a plurality of approximate spherical shapes, wherein intervals between vertices in the respective created ones of the plurality of approximate spherical shapes are substantially equal and each vertex is set as a viewpoint position, intervals between the viewpoint positions being different for each of the created ones of the plurality of approximate spherical shapes; and operation as a template creation unit configured to create, for each of the created ones of the plurality of approximate spherical shapes, a plurality of templates, each of the created plurality of templates having a different resolution and each template of each of the created plurality of templates created using a projection image corresponding to a target object viewed from each of the set viewpoint positions, wherein a number of ones of the set viewpoint positions of the plurality of templates having a first resolution are selected as slave viewpoints and are associated with one of the set viewpoint positions selected as a master viewpoint that corresponds to one of the created plurality of templates having a second resolution lower than the first resolution, and the number of the selected slave viewpoints associated with each selected master viewpoint in the created plurality of approximate spherical shapes is substantially equal.

2. The template creation apparatus according to claim 1, wherein the vertices are provided on the created plurality of approximate spherical shapes, the intervals between the set viewpoint positions differ and a number of the set viewpoint positions differs, for each of the created ones of the plurality of approximate spherical shapes, and by associating a plurality of the set viewpoints of the created ones of the plurality of approximate spherical shapes in which the interval between the set viewpoint positions is narrower with one viewpoint of the created ones of the plurality of approximate spherical shapes in which the interval between the set viewpoint positions is wider, a number of the plurality of the set viewpoints associated with the one viewpoint is substantially equal for each of the set viewpoint positions of the created plurality of approximate spherical shapes in which the interval between the set viewpoint positions is wider.

3. The template creation apparatus according to claim 2, wherein the processor is configured to perform operations further comprising:

operation as a viewpoint position-related parameter setting unit configured to set an interval between the set viewpoint positions that is appropriate for a shape and size of the target object, and the processor is configured to perform operations such that operation as the viewpoint position creation unit comprises operation as the viewpoint position creation unit that is configured to create the plurality of the approximate spherical shapes based on the set interval between the set viewpoint positions.

4. The template creation apparatus according to claim 1, wherein the processor is configured to perform operations further comprising:

operation as an optimal viewpoint position creation unit configured to, in response to each of the set viewpoint positions in the created one of the plurality of approximate spherical shapes in which the intervals are wider being selected as the master viewpoint and each of the viewpoint positions set in the created one of the plurality of approximate spherical shapes in which the intervals are narrower being selected as the slave viewpoints, calculate a rotation angle for which a maximum distance between the master viewpoint and the slave viewpoints associated with the master viewpoint will be a minimum, and, configured to, by performing processing to rotate each of the created ones of the plurality of approximate spherical shapes by the calculated rotation angle, calculate an optimal viewpoint position corresponding to each of the set viewpoint positions after rotation by the calculated rotation angle, and the processor is configured to perform operations such that operation as the template creation unit comprises operation as the template creation unit that is configured to create, for each of the created ones of the plurality of approximate spherical shapes, a plurality of templates created using a projection image corresponding to the target object viewed from each of the calculated optimal viewpoint positions.

5. The template creation apparatus according to claim 1, wherein the processor is configured to perform operations further comprising:

operation as a viewpoint position-related parameter setting unit configured to set an interval between the set viewpoint positions that is appropriate for a shape and size of the target object, and the processor is configured to perform operations such that operation as the viewpoint position creation unit comprises operation as the viewpoint position creation unit that is configured to create the plurality of the approximate spherical shapes based on the set interval between the set viewpoint positions.

6. An object recognition processing apparatus that performs recognition of an object using the plurality of templates created by the template creation apparatus according to claim 1, the object recognition processing apparatus comprising a processor configured to perform operations comprising:
    operation as an image acquisition unit configured to acquire an input image of the target object; and
    operation as a template matching unit configured to perform matching with the input image of the target object using the plurality of templates corresponding to the target object viewed from each of the set viewpoint positions created by the template creation unit.

7. The object recognition processing apparatus according to claim 6, wherein the object recognition processing apparatus performs recognition of the target object by template matching in a coarse-to-fine search.

8. A template creation method for creating hierarchical templates for object recognition used for template matching, the template creation method comprising:
    creating a plurality of approximate spherical shapes, wherein intervals between vertices in the respective created ones of the plurality of approximate spherical shapes are substantially equal and each vertex is set as a viewpoint position, intervals between the viewpoint positions being different for each of the created ones of the plurality of approximate spherical shapes; and
    creating, for each of the created ones of the plurality of approximate spherical shapes, a plurality of templates, each of the created plurality of templates having a different resolution and each template of each of the created plurality of templates created using a projection image corresponding to a target object viewed from each of the set viewpoint positions, wherein
    a number of ones of the set viewpoint positions of the plurality of templates having a first resolution are selected as slave viewpoints and are associated with one of the set viewpoint positions selected as a master viewpoint that corresponds to one of the created plurality of templates having a second resolution lower than the first resolution, and
    the number of the selected slave viewpoints associated with each selected master viewpoint in the created plurality of approximate spherical shapes is substantially equal.

9. A non-transitory computer-readable storage medium storing a program that causes a computer to create hierarchical templates for object recognition to be used for template matching, the program causing the computer to perform operations comprising:
    creating a plurality of approximate spherical shapes, wherein intervals between vertices in the respective created ones of the plurality of approximate spherical shapes are substantially equal and each vertex is set as a viewpoint position, intervals between the viewpoint positions being different for each of the created ones of the plurality of approximate spherical shapes; and
    creating, for each of the created ones of the plurality of approximate spherical shapes, a plurality of templates, each of the created plurality of templates having a different resolution and each template of each of the created plurality of templates created using a projection image corresponding to a target object viewed from each of the set viewpoint positions, wherein
    a number of ones of the set viewpoint positions of the plurality of templates having a first resolution are selected as slave viewpoints and are associated with one of the set viewpoint positions selected as a master viewpoint that corresponds to one of the created plurality of templates having a second resolution lower than the first resolution, and
    the number of the selected slave viewpoints associated with each selected master viewpoint in the created plurality of approximate spherical shapes is substantially equal.

* * * * *